United States Patent [19]

Salim et al.

[11] 4,325,205

[45] Apr. 20, 1982

[54] MODULAR SOLAR BUILDING CONSTRUCTION

[75] Inventors: Massoud A. Salim; Thomas L. Hamacher, both of Salt Lake City, Utah

[73] Assignee: Tios Corporation, Salt Lake City, Utah

[21] Appl. No.: 135,367

[22] Filed: Mar. 31, 1980

[51] Int. Cl.$^3$ .............................................. E04H 1/00
[52] U.S. Cl. .................................. 52/79.1; 52/236.1; 126/417
[58] Field of Search ............... 52/79.1, 79.4, DIG. 16, 52/236.1; D25/32; 126/428, 417

[56] References Cited

FOREIGN PATENT DOCUMENTS 2456620 8/1976 Fed. Rep. of Germany ........ 52/794

OTHER PUBLICATIONS

*Passive Solar—A Controlled Experiment in Home Heating,* Popular Science, Apr. 1978, pp. 78–79.

*Primary Examiner*—Price C. Faw, Jr.
*Assistant Examiner*—Carl D. Friedman
*Attorney, Agent, or Firm*—Thorpe, North & Western

[57] ABSTRACT

Solar building construction utilizing a rectangular shaped module, typically square, from which a corner has been cut-off or removed. The opening left in the module by the cut-off corner is panelled and closed in with glass. The module is oriented so that the glass panel, which may include sliding or hinged glass doors, faces in a direction that is exposed to the sun for a maximum number of hours during the colder winter months when the sun is relatively low in the sky. The sun's rays are allowed to deeply penetrate into the interior of the module through the use of open space and carefully positioned interior walls. At least some of these walls are typically perpendicular to the plane created by the glass panel. Both interior and exterior walls, and other fixtures within the modules, are realized using items having a favorable thermal mass. The solar modules thus created may be used individually, as in the case of a single solar building or they may be stacked both horizontally and vertically, thereby creating an economical and efficient solar building complex suitable for apartment houses, townhouses, condominiums, and the like.

18 Claims, 7 Drawing Figures

MODULAR SOLAR BUILDING CONSTRUCTION

BACKGROUND OF THE INVENTION

This invention relates to building construction adapted for passive solar heating and for a method of designing such construction; and more particularly to modular solar building construction designed to yield economical, yet solar efficient, apartment complexes, condominiums, cluster housing, and the like.

As the world's population increases, and as the world's limited energy resources decrease, there is an ever increasing need for economical, easily constructed, and energy efficient housing. Using energy from the sun to warm buildings (and for other energy needs, such as producing hot water) represents one of the simplest and most practical applications of what is, for all practical purposes, an unlimited energy resource.

Ordinary window glass is the basic material that makes solar heating possible. That is, sunlight passes easily through glass and can be made to strike a darkened surface. A significant portion of the sunlight that strikes such a surface changes from visible light to heat. While the light can be reflected back out again through the glass, the heat is absorbed or trapped by the glass. This phenomenon, which is often termed "the green house effect", is well known in the prior art. In fact, many homes utilize the green house effect through features as simple as a south-facing window. Such a window, at least for houses in the northern hemisphere, admits direct sunlight during most of the day during the winter months of the year when the sun is relatively low in the southern sky. The window glass traps the solar heat, adding warmth to the room where the window is located. The window may be double glazed, thereby enhancing its warming effect because the double glass panes prevent less inside warm air from being lost to the outside and less cold air from infiltrating into the house.

Solar designers and architects have recognized for many years a number of building features that can take similar advantage of solar energy. Such systems, often called "passive systems" (because they require few, if any, mechanical or working parts), are usually an integral part of the building. Accordingly, such systems are most suitable for new construction. A simple passive solar system might include positioning or orienting the building so that the walls and roof receive maximum solar radiation during the winter months of the year. For example, if a house is to be built in a northern hemisphere location (that is, where the sun is relatively low in the southern sky during the winter months of the year), a solar designer may utilize a rectangular structure and place the long axis so that it runs east-west, thereby allowing a southerly exposure for the long side of the building. (The same principle, of course, is applicable for houses built in a southern hemisphere location, where the winter sun is relatively low in the northern sky, thereby encouraging a northerly exposure for the long side of the building.)

Other simple solar features include large window openings on the side of the house exposed to the winter sun, and small windows, or none at all, on the side not exposed to the winter sun. These features serve to maximize solar heat gain and retention of heat in the winter. Unfortunately, even if the windows are double (or triple) glazed, they do not provide an efficient thermal wall for the retention of heat inside the house during the winter (and the retention of cooler temperatures inside the house during the summer). Accordingly, good thermal design requires that a balance be struck between the area of space allocated to windows, the amount of heat that can be gained through the windows during sunny, winter daylight hours, the amount of heat that will be lost through the windows during night-time (or other non-sunlight) hours, and the amount of undesirable heat that will pass through the windows during the hotter summer months of the year. Conventional shaped houses and window placement make this balance (between heat loss and heat gain through windowed areas) extremely difficult to achieve.

Movable shutters and awnings, or fixed overhangs, may be effectively used in the summer to shield excess solar radiation from entering the house. Also, it is to be noted that heavy construction material, such as brick, concrete, stone, or adobe, are favored by solar designers because they provide what is termed "thermal mass." A good thermal mass material positioned within the heated space exhibits the property of absorbing and storing heat, which heat may be released slowly over a long period of time. For example, a concrete or stone wall can be designed to absorb heat during the day and release this heat slowly during the night, thereby helping to moderate the day-night temperature differences.

As explained above, the most efficient solar houses require a lot where a rectangular house may be positioned to maximize exposure to the winter sun, such as by placing the long axis so that it runs east-west. However, not all building lots are favorable for this kind of house orientation. Therefore, if such an unfavorable solar lot is to be used, careful and expensive design of the house must be used to take maximum advantage of available solar energy. Such carefully designed houses, especially with the inflated building and design costs of today's economy, are not affordable for many buyers.

One of the shortcomings of simply placing a window along the side of the structure exposed to the winter sun is that solar energy that enters through such windows is typically trapped within the room where the window is located. Thus, the structure may have rooms along one side that are efficiently warmed (and often over-heated) by the sun's energy, but the remainder of the house is not able to efficiently benefit from this energy. While there are solar systems adapted to transfer this energy throughout the entire house, (such as blowers, fans, or even passive systems such as the "Trombe wall"), these systems are either very expensive or make inefficient use of the available space within the house. Moreover, even if windows are placed along the side of the building exposed to the winter sun, such windows are typically limited in the effective hours during which the sun's rays may pass therethrough. For example, many solar designers feel it is best to orient the windows so that they face slightly to the southeast (for a northern hemisphere location), thereby permitting the building to receive more sunlight earlier in the day when it needs to recover the warmth that has been lost overnight. However, when this is done, then the solar heat that could be gained in the later afternoon hours is lost. Furthermore, even if the window is faced so as to take maximum advantage of both the morning and the afternoon sun, the interior walls of the buildings often limit the penetration depths to which the morning and/or afternoon sun may reach within the structure of the house.

One of the techniques currently used to keep construction costs at a minimum is "modular housing." Modulator housing typically involves square or rectangular modules that are easily assembled, often from prefabricated materials, so as to quickly, efficiently, and economically provide a modest living space. Unfortunately, because economy seems to be the touchstone of such housing, considerations for efficient solar design of modular housing are practically nonexistent.

SUMMARY OF THE INVENTION

A principal object of the present invention is to provide solar housing, and a method for designing and constructing the same, that is relatively inexpensive and solar efficient.

A further object of the present invention is to provide inexpensive solar housing that allows solar energy to penetrate deeply into the interior of the house throughout all the winter daylight hours, thereby allowing solar heat to efficiently warm more than just one side of the house throughout the entire daylight hours.

Another object of the present invention is to provide such housing that utilizes an optimally efficient amount of window glass so as to carefully balance heat gain and heat loss during all months of the year without the need for using movable shutters or awnings.

Still another object of the present invention, in accordance with one embodiment thereof, is to provide efficient inexpensive modular solar housing that lends itself for use with inexpensive modular construction techniques, thereby providing a means for building multi-unit complexes that not only help ease the low cost housing shortage but also help reduce energy demand.

The above and other objects of the invention are realized using a building construction technique that employs an easily constructed, inexpensive, rectangular shaped module, including roof and floor structure, as its basic unit. This basic module is modified, however, with a diagonal cut that removes one corner therefrom. The diagonal cut is then faced with glass, and the building module is oriented on the building lot so that the plane of the diagonal cut generally faces south, or in another suitable direction that allows the sun's rays during the winter months of the year to enter therein for a maximum number of hours during each day. For example, where the module is located in a northern hemisphere location and has its diagonal cut facing south, the sun's rays may penetrate through the diagonal cut into the western corner of the module during the morning hours when the sun is generally in the southeastern sky. Likewise, during mid-day, when the sun is generally in the south, the sun's rays may penetrate straight through the diagonal cut into the far northern corner of the module. Similarly, during the afternoon hours, when the sun is generally in the southwestern sky, the sun's rays may penetrate through the diagonal cut into the eastern corner of the module. Thus, in this fashion, there is always some portion of the module that is collecting heat from the sun.

Interior walls within the module are used sparingly so as not to block the deep penetration of the sun's rays. However, what walls are used, are generally oriented so as to be normal to the plane of the diagonal cut, thereby funneling the sun's rays, either directly or through a series of reflections, deeper into the interior of the module.

The size of the diagonal cut, and hence the amount of window glass that is employed, is optimally selected so as to carefully balance heat gain and heat loss considerations. An overhang extends out over and above the diagonal cut so as to block the sun's rays from entering therethrough during the summer months when the sun is higher in the sky.

In accordance with one embodiment of the invention, several modules, each having a diagonal cut removing a corner therefrom, may be stacked together, either horizontally, vertically, or both. Each module is oriented so that its diagonal cut allows the sun's rays to enter the module for the maximum number of hours each day during the winter months of the year. In order to minimize construction costs, common structure between adjacent modules may be shared. That is, for modules that are stacked vertically, the roof structure of a lower module may also serve as the floor structure for the upper module. Similarly, for modules that are stacked horizontally, the exterior walls separating adjacent modules may be, at least in part, realized as a common wall.

BRIEF DESCRIPTION OF THE DRAWINGS

The above and other objects, features, and advantages of the invention will be more apparent from the following more particular description presented in connection with the accompanying drawings, in which.

DESCRIPTION OF THE PREFERRED EMBODIMENTS

Figure 1:
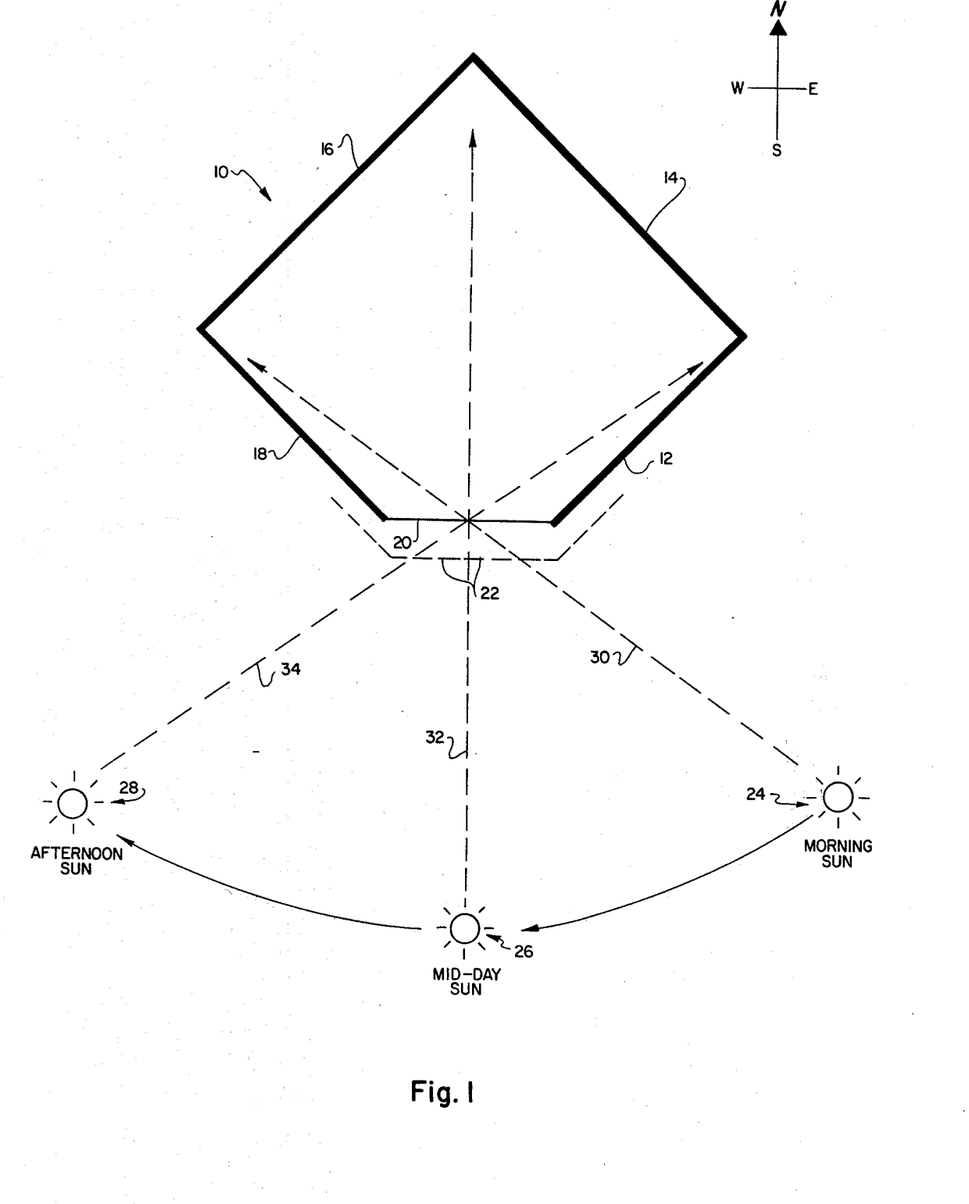
FIG. 1 is a simplified top view of a solar module illustrating the manner in which solar rays penetrate deeply into the module during all hours of the day.

Referring first to FIG. 1, there is shown a simplified view of a solar module 10 that comprises the basic unit of the invention herein disclosed. While the module 10 shown in the figures is generally depicted as a square module, it is to be understood that the invention also includes any rectangular or similar shape that lends itself to allow the sun's rays to enter therein in the manner described.

The solar module 10 shown in FIG. 1 includes exterior walls 12, 14, 16, and 18. A diagonal cut 20 cuts off the corner formed by the exterior walls 12 and 18. A glass wall, which may include glass doors, is placed along the diagonal cut 20 so as to enclose the module 10. Suitable flooring structure and roof structure (not shown) are used to complete the enclosure of the module. Typically, the roof structure will extend out beyond the diagonal cut 20 in an area defined by the dotted lines 22.

The module 10 is oriented so that the diagonal cut 20 receives maximum exposure from the winter sun. For purposes of this application, it will be assumed that the solar module 10 will be used in a northern hemisphere location, meaning that the winter sun will appear relatively low in the southern sky. However, it is to be understood, that the application also includes a solar module 10 located in any hemisphere or in any orientation that gives the diagonal cut 20 maximum exposure to the sun during the winter or colder months of the year.

With the solar module 10 oriented as shown in FIG. 1, that is, with the diagonal cut 20 generally facing in a southerly direction, the rays from the sun, shown symbolically at positions 24, 26 and 28, are allowed to enter into the far corners of the module throughout all hours of the day. For example, the rays from the morning sun 24 generally follow a path as indicated by the dotted line 30 into the western portion of the module 10. As the day progresses, and the sun moves relative to the module 10 in a westerly direction, the rays from the mid-day sun 26 generally follow a path as indicated by the dotted line 32 into the northern corner of the module 10. Likewise, rays from the afternoon sun 28 follow a path 34 into the eastern portion of the module 10. In this manner, some portion of the solar module 10 is always collecting rays from the sun during all hours of the day.

Figure 2:
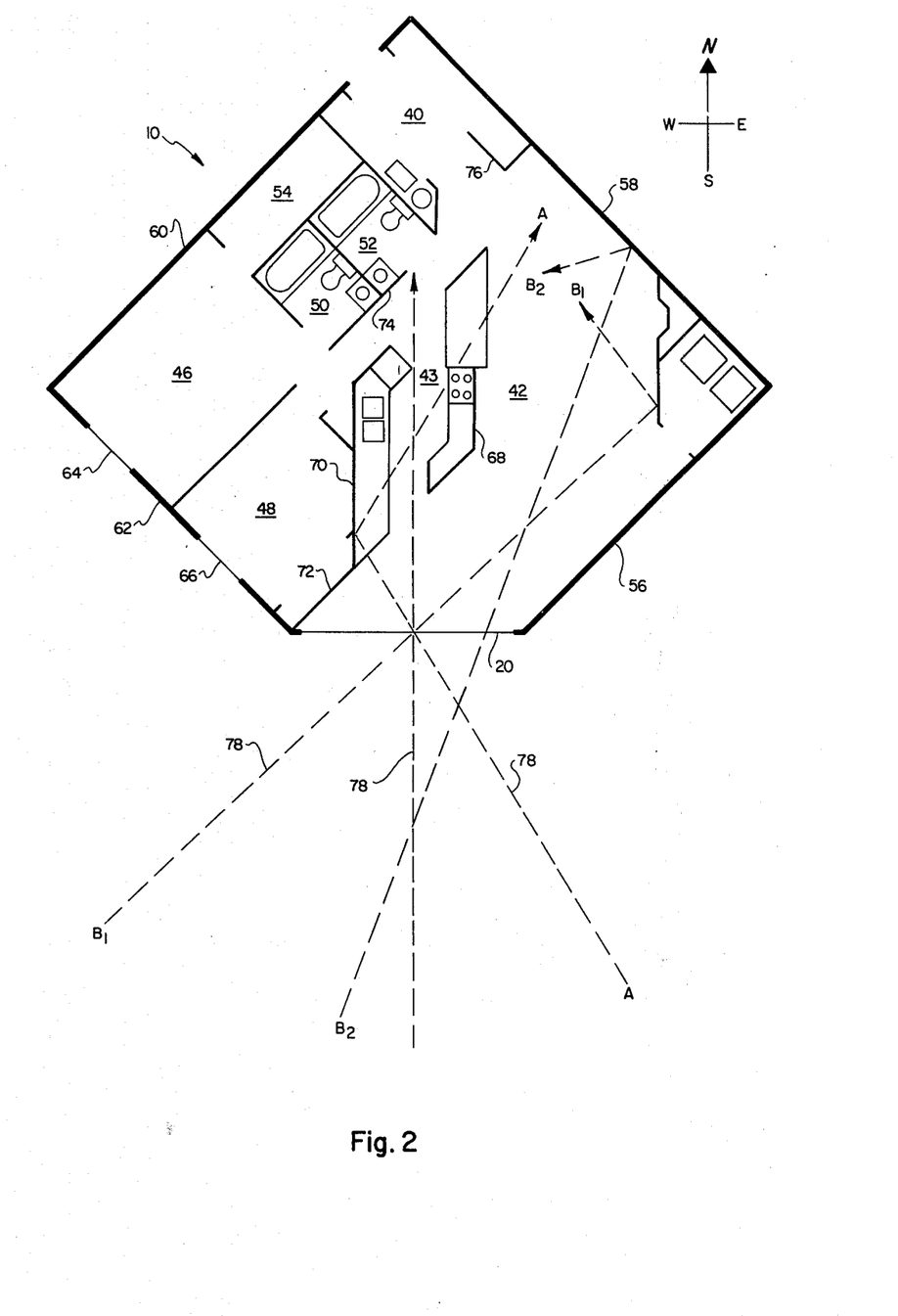
FIG. 2 is a representative floor plan of the solar module showing a typical orientation of interior walls.

FIG. 2 illustrates how the basic solar module 10 of FIG. 1 may be further modified through the use of interior walls and other fixtures to define a complete livable floor plan. For example, the floor plan shown in FIG. 2, which is only representative of a large number of floor plans that could be realized, includes an entry hall 40, a living area 42, a kitchen 43, a master bedroom 46, and a second bedroom or study 48. Two bathrooms 50 and 52 are also included, as is a walk-in closet 54. As with the basic module 10 shown in FIG. 1, the solar building construction shown in FIG. 2 includes exterior walls 56, 58, 60 and 62. Also included is a diagonal cut 20. The diagonal cut 20 is faced with glass so as to allow the sun's rays to easily pass therethrough. Also included are glass windows 64 and 66. In the embodiment shown, the diagonal cut 20 intersects the exterior walls 56 and 62 at a point that makes these walls about three-fourths the length of exterior walls 58 and 60. This size of diagonal cut 20 (and corresponding glass wall) has been determined by the inventors to be the optimal size for achieving a balanced heat gain and heat loss condition when a five-sided structure of the type shown in FIGS. 1-6 is employed.

A significant feature of the invention herein disclosed is the positioning of walls, both exterior and interior, so as to cause the sun's rays to reflect or penetrate deeper into the structure. For example, unless the sun's rays are normal to the exterior walls, the exterior walls themselves will generally act as a funnel and direct the solar energy deeper into the interior of the module. Moreover, the invention includes the use of primary interior walls that are generally perpendicular to the plane formed by the diagonal cut 20. An example of such primary walls are the walls 68 and 70. Positioning primary walls in this fashion further allows the sun's rays to penetrate deeply into the interior of the building before being blocked or absorbed by secondary interior walls. For purposes of this application, secondary interior walls are those walls that are generally orthogonal to each other and to the exterior walls of the particular structure. Thus, the interior walls 72, 74 and 76 are representative of "secondary" interior walls.

The function of the primary walls, such as walls 68 and 70, is not only to allow deep penetration of the sun's rays 78 when said rays are generally parallel to the primary walls (as would occur typically during the mid-day hours), but also to reflect the sun's rays 78 deeper into the interior of the building during the morning or afternoon hours. Such reflection of the sun's rays 78 is illustrated generally by the dotted line labeled A—A (morning hours) and the dotted line B1—B1 (afternoon hours). Note that exterior walls 58 also serves this same function as illustrated by the dotted line B2—B2. Ideally, the interior walls, both primary and secondary, are comprised of materials that not only reflect the sun's rays but that also absorb heat derived therefrom. In other words, the materials from which the primary and secondary walls are made, may be selected from those kinds of materials that provide a good thermal mass. These walls thus serve as a collector of solar heat derived from the sun's rays and additionally serve to store this heat for subsequent emission.

Figure 3:
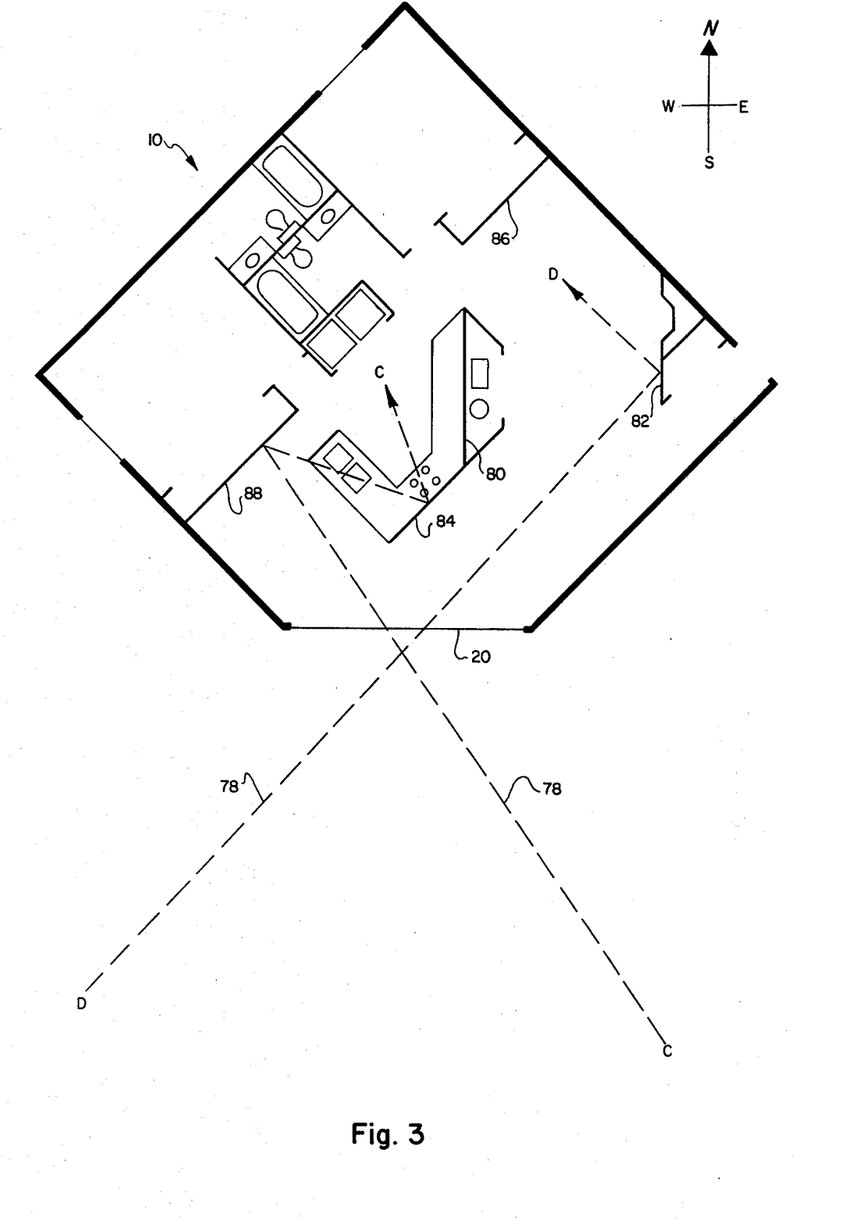
FIG. 3 is another representative floor plan of the solar module.

FIG. 3 is another floor plan that is representative of the types of floor plans and variations that can be utilized with the invention. The particular floor plan of FIG. 3 employs only two primary walls, 80 and 82. However, these primary walls, in combination with the secondary walls 84, 86 and 88 (and other secondary walls), achieve the same overall objective as those shown in FIG. 2. That is, the sun's rays 78 are allowed to penetrate deeply into the interior of the building. For example, during the morning, the sun's rays 78 may follow a path as indicated by the dotted line C—C. Similarly, in the afternoon, these rays 78 could follow a path as indicated by the dotted line labeled D—D.

It is to be noted that the floor plans of FIGS. 2 and 3 are only representative of a large number of such floor plans that could be devised. The objective of any floor plan that is used, of course, is to strategically place the primary walls in relation to the secondary walls so as to direct the sun's rays deeply into the interior of the building.

Figure 4:
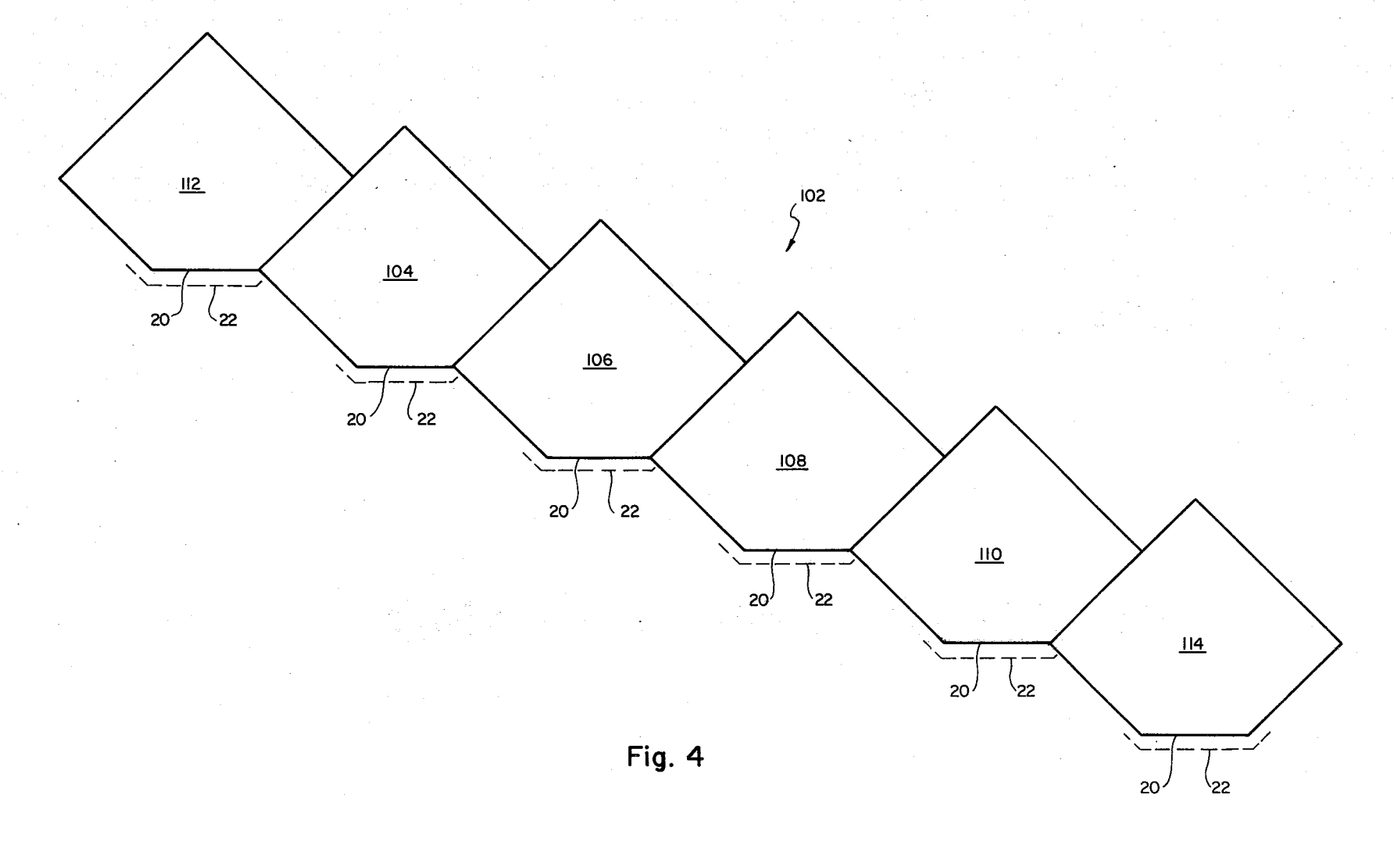
FIG. 4 shows a representative layout for a multi-unit modular solar building complex.

Referring now to FIG. 4, there is shown a representative layout of a solar building complex 102 that employs a plurality of individual solar modules of the type described in connection with FIGS. 1 through 3. Note that the interior modules 104, 106, 108 and 110, might appropriately each have a floor plan similar to that shown in FIG. 2, wherein exterior windows 64 and 66 only appear along one exterior wall thereof. Similarly, the end modules 112 and 114 could utilize a floor plan similar to that shown in FIG. 3, wherein exterior windows, in addition to the diagonal cut 20, occur along two exterior walls. In order to reduce construction costs, adjacent modules, such as modules 110 and 114, share a common wall 116 between them. The diagonal cut 20 associated with module 110 may begin as soon as this wall 116 is no longer shared in common with module 114. Of course, each module 104 through 114, has associated therewith its own individual diagonal cut 20 that allows the sun's rays to efficiently enter into each module.

Figure 5:
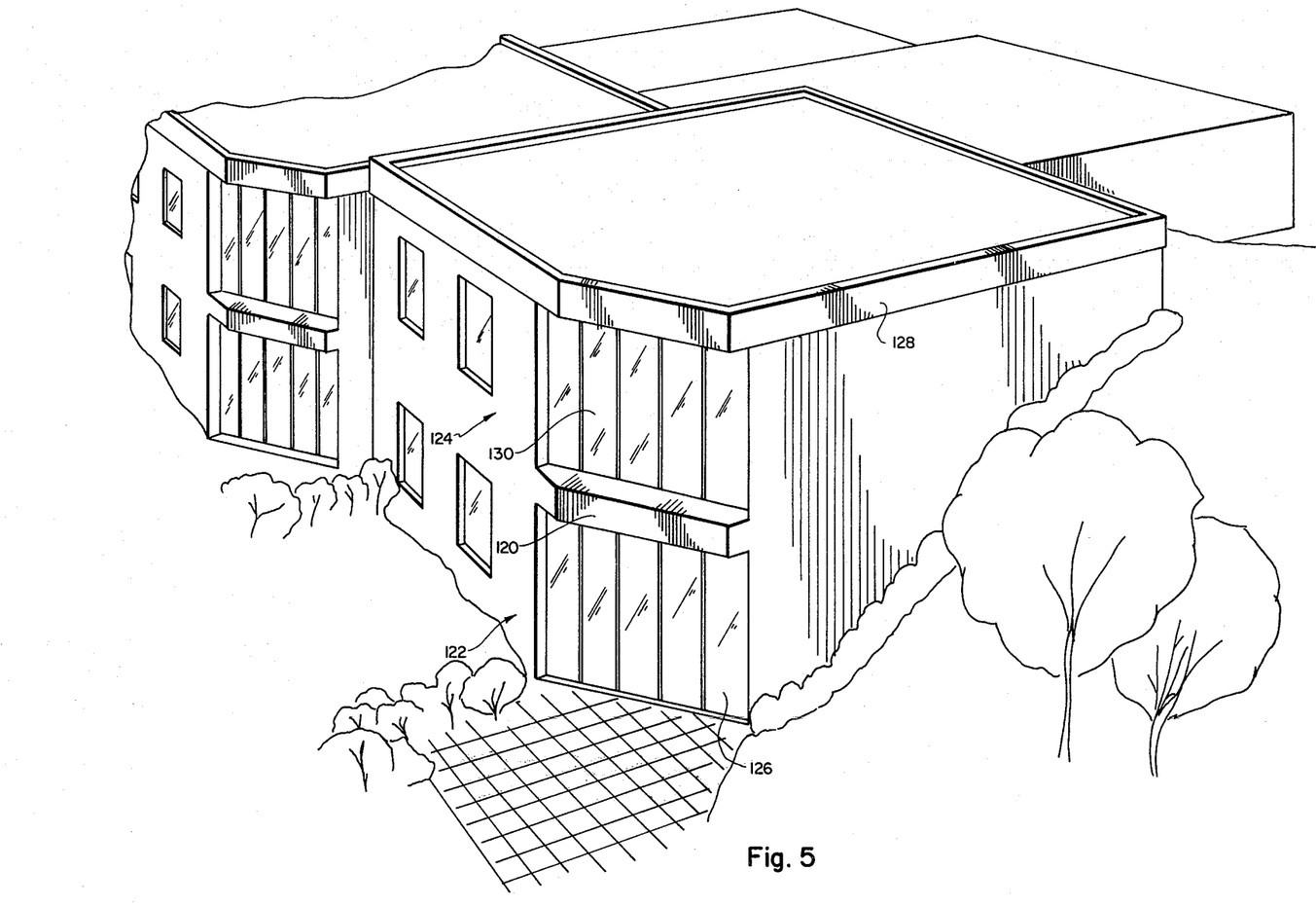
FIG. 5 is a perspective view of a two-story solar building complex.

In addition to stacking the modules side-by-side or horizontally as illustrated in the layout of FIG. 4, the modules may also be stacked vertically as best illustrated in the perspective view of FIG. 5. FIG. 5 illustrates a two-story vertical stacking of the individual solar units. However, it is to be understood that the invention contemplates vertical stacking of any desired number, thereby allowing high-rise structures of any suitable height to be developed. FIG. 5 also illustrates how the roof structure 120 of a lower solar module 122 may also serve as the floor structure of an upper module 124. This same roof/floor structure 120 also defines an overhang that shields the diagonal cut 126 of the lower module 122 from the sun's rays when the sun is higher in the sky such as occurs during the summer or warmer months of the year. Similarly, the roof structure 128 of the upper module 124 also shields the diagonal cut 130 of the upper modual 124 from the sun's rays during the summer months. As shown in the perspective view of FIG. 5, the diagonal cuts 126 and 130 are generally comprised of glass panels, at least a portion of which may be glass sliding doors to allow access to a patio or balcony area.

Figure 6A:
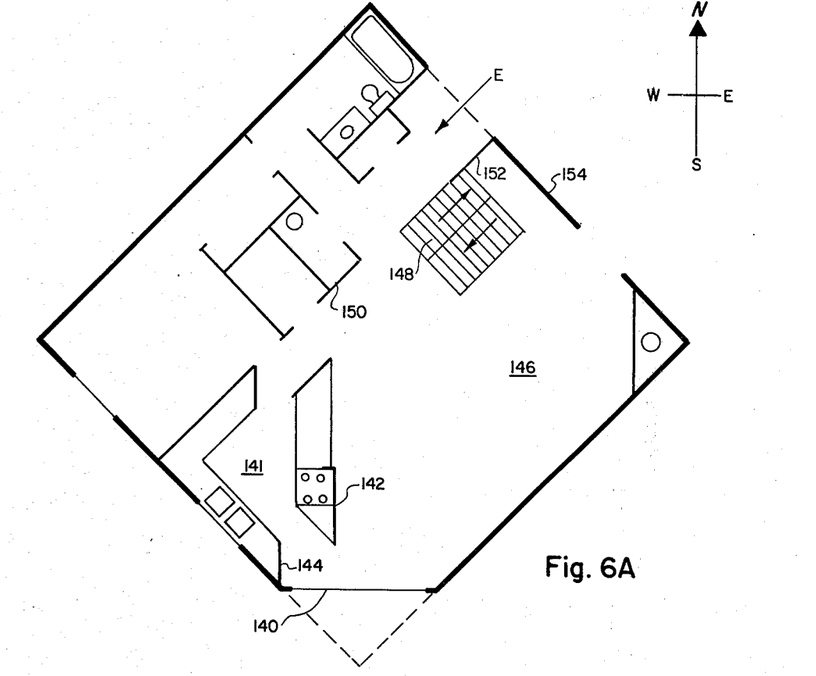
FIGS. 6A and 6B show representative floor plans of the upper and lower levels, respectively, of a two-story solar modular townhouse.
Figure 6B:
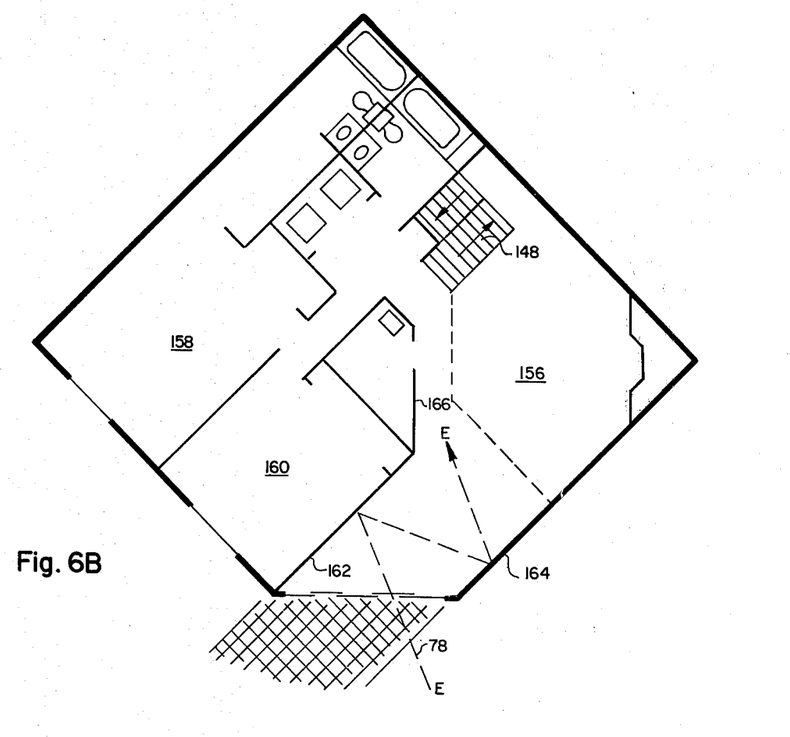

Finally, referring to FIGS. 6A and 6B, there is shown representative floor plans for a townhouse solar unit that employs both first and second levels that belong to the same unit. FIG. 6A shows a representative floor plan for the upper level, while FIG. 6B shows a representative floor plan for a lower level. The upper level of FIG. 6A employs a diagonal cut 140 that is suitably panelled with glass so as to allow the sun's rays to easily enter therein. The kitchen area 141 is generally built around primary walls 142 and 144, while the living area 146 is generally open. Stairs 148 lead down to the lower level shown in FIG. 6B. Both the primary wall 142 of FIG. 6A as well as the secondary walls 150 and 152, and the exterior wall 154 may be appropriately made from a material that has an excellent thermal mass.

The lower level of the solar townhouse shown in FIG. 6B, includes a family room area 156 and two bedrooms 158 and 160. While the majority of the interior walls of the lower level are what has been termed "secondary" interior walls, they are nonetheless positioned so as to advantageously reflect the sun's rays into the interior of the lower level. For example, the sun's rays 78 during the morning hours might follow a path as indicated by the dotted line E—E in FIG. 6B, being either absorbed in the secondary wall 162 or reflected therefrom to the inside of the exterior wall 164. This exterior wall 164 may, in turn, either absorb the heat from the ray 78 or reflect it further towards the interior of the module. The primary wall 166 allows such rays to penetrate all the way to the stairs 148. These stairs 148 would advantageously be comprised of a material having a high thermal mass.

While the invention herein disclosed has been described by means of specific embodiments and applications thereof, numerous modifications and variations could be made thereto by those skilled in the art without departing from the spirit and scope of the present invention. It is therefore to be understood that within the scope of the appended claims, the invention may be practiced otherwise than as specifically described herein.

What is claimed is:

1. Solar building construction comprising:
    a five-sided building comprising a generally rectangular shaped building having a cut-off corner, said cut-off corner being defined by a diagonal cut along a generally vertical plane that intersects adjacent exterior walls of said building, a fifth exterior wall along said cut-off corner having more than one half of the surface area thereof as an opening through which solar rays from the sun may pass, said building being oriented so that said fifth wall is exposed to the sun for the longest possible time during the winter months when the sun is low in the sky, whereby solar rays from the sun may enter said building through said opening for a maximum time during daylight hours;
    translucent enclosure means for selectively enclosing said opening of said fifth wall and preventing air from passing therethrough while still allowing passage of solar rays and light therethrough;
    penetration means for allowing said solar rays to deeply penetrate into the interior of said building and be absorbed therein after said rays have passed through said opening; and
    overhang means above and extending outwardly from said fifth wall for preventing said solar rays from entering through said opening of said fifth wall during the summer months when the sun is high in the sky.

2. Solar building construction as defined in claim 1 wherein said penetration means comprises positioning primary interior walls so as to enhance reflective penetration of radiation passing through said fifth exterior wall, thereby permitting said solar rays to deeply penetrate into the interior of said building by directly passing by and being reflected off of said primary walls, said primary walls serving to divide, in part, the interior of said five-sided building into habital rooms.

3. Solar building construction as defined in claim 2 wherein said penetration means further comprises positioning secondary interior walls so as to be generally non-orthogonal with said primary interior walls.

4. Solar building construction as defined in claim 3 further including collection means advantageously positioned inside of said building for absorption of said solar rays, said collection means adapted to retain and emit heat energy derived from said absorbed solar rays.

5. Solar building construction as defined in claim 3 wherein said fifth exterior wall comprises a wall that is at least 75% transparent material.

6. Solar building construction as defined in claim 4 wherein said collection means includes interior thermal walls made from materials adapted to collect, store, and emit heat, such as cement, bricks, clay, and the like.

7. Modular solar building construction comprising:
    a plurality of building modules connected together, each module having floor and roof structure, exterior walls, and a diagonal wall along a cut-off corner of said module defined by a diagonal cut along a generally vertical plane that intersects adjacent exterior walls, said diagonal wall being placed along said vertical plane so as to enclose said module, said diagonal wall having more than one half of the surface area thereof as an opening through which solar rays from the sun may pass;
    an orientation of said connected building modules that places all of said diagonal walls substantially parallel to each other and that exposes each diagonal wall to the sun for the longest possible time during the winter months when the sun is low in the sky, thereby allowing solar rays from the sun to enter each of said modules through the openings of said diagonal walls;
    penetration means inside of each module for allowing solar rays to deeply penetrate into the interior of each of said modules and be absorbed therein after said rays have passed through said openings of said diagonal walls; and
    overhang means above said diagonal wall of each of said modules for preventing said solar rays from entering through said opening of said diagonal wall during the summer months when the sun is high in the sky.

8. Modular solar building construction as defined in claim 7 wherein said penetration means comprises positioning primary interior walls inside of each module so as to enhance reflective penetration of radiation passing through said diagonal wall of each module, thereby permitting said solar rays to pass by and be reflected off of said primary walls so as to deeply penetrate into the interior of each module, said primary walls serving to divide, in part, the interior of said module into habitat rooms.

9. Solar building construction as defined in claim 8 wherein said penetration means further comprises positioning secondary interior walls so as to be generally non-orthogonal with said primary interior walls.

10. Modular solar building construction as defined in claim 9 wherein said building modules are connected side-by-side, with adjacent modules sharing a common exterior wall along at least a portion of fronting exterior walls.

11. Modular solar building construction as defined in claim 9 wherein said building modules are connected one on top of the other, with the roof structure of a lower module serving at least in part as the floor structure of an upper module.

12. Modular solar building construction as defined in claim 9 wherein some of said building modules are connected side-by-side with adjacent modules having a common exterior wall along at least a portion of fronting exterior walls, and wherein other of said building modules are connected one on top of the other with the roof structure of lower modules serving at least in part as the floor structure of upper modules, thereby creating a multi-unit, multi-level, solar building.

13. Modular solar building construction as defined in claim 9 further including collection means advantageously positioned inside of each of said modules for absorption of said solar rays, said collections means adapted to retain and emit heat energy derived from said absorbed solar rays.

14. Modular solar building construction as defined in claim 13 wherein said collection means includes interior walls made from materials adapted to collect, store and emit heat, such as cement, bricks, clay, and the like.

15. Modular solar building construction as defined in claim 9 wherein said diagonal wall of each of said modules comprises a wall that is at least 75% transparent material.

16. A method of designing and constructing buildings adapted for solar heating comprising the steps of:
 (a) Allocating the desired floor space of said building to a rectangular shaped module, said rectangular shape including a square;
 (b) removing one of the corners of said rectangular shaped floor space with a diagonal cut that intersects adjacent sides of said module, thereby defining at least a five-sided area that can be used as available floor space;
 (c) placing appropriate exterior walls around the perimeter of said area, including a diagonal exterior wall along said diagonal cut that comprises mostly glass;
 (d) orienting said building on a chosen site so that said exterior glass diagonal wall allows rays of sunlight to enter therethrough for a maximum number of hours each day during the winter months of the year when the sun is low in the sky;
 (e) placing appropriate interior walls inside of said exterior walls so as to allow deep penetration of said rays of sunlight into said building, some of said interior walls being positioned perpendicular to said exterior glass diagonal wall, and other of said interior walls being positioned so as to reflect said rays of sunlight to another part of the interior of said building; and
 (f) placing a roof structure over said walls, said roof structure having an overhang that extends over said exterior glass diagonal wall to prevent said rays of sunlight from passing through said glass exterior wall during the summer months when the sun is high in the sky.

17. A method of designing and constructing solar buildings as defined in claim 16 wherein said building further comprises a plurality of levels and wherein said roof structure referred to in step (f) further comprises the floor of the next higher level.

18. A method of designing solar buildings as defined in claim 16 further including a plurality of said solar buildings positioned side-by-side, each of said buildings having respective exterior glass diagonal walls that are substantially parallel to each other.

* * * * *